US012730412B2

(12) United States Patent
Fuji

(10) Patent No.: US 12,730,412 B2
(45) Date of Patent: Sep. 8, 2026

(54) WATCH COMPONENT, WATCH, AND METHOD FOR MANUFACTURING WATCH COMPONENT

(71) Applicant: SEIKO EPSON CORPORATION, Tokyo (JP)

(72) Inventor: Tsubasa Fuji, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 343 days.

(21) Appl. No.: 18/475,287

(22) Filed: Sep. 27, 2023

(65) Prior Publication Data

US 2024/0111251 A1 Apr. 4, 2024

(30) Foreign Application Priority Data

Sep. 28, 2022 (JP) ................................ 2022-154717

(51) Int. Cl.

| | |
|---|---|
| ***G04B 45/00*** | (2006.01) |
| ***G02B 1/11*** | (2015.01) |
| ***G02B 1/113*** | (2015.01) |
| ***G02B 1/115*** | (2015.01) |
| ***G02B 5/00*** | (2006.01) |
| ***G02B 5/22*** | (2006.01) |
| ***G02B 5/28*** | (2006.01) |
| ***G04D 3/00*** | (2006.01) |

(52) U.S. Cl.

CPC ....... *G04B 45/0076* (2013.01); *G04D 3/0069* (2013.01); *G04D 3/0074* (2013.01); *G02B 1/11* (2013.01); *G02B 1/113* (2013.01); *G02B 1/115* (2013.01); *G02B 5/003* (2013.01); *G02B 5/22* (2013.01); *G02B 5/28* (2013.01); *G02B 5/285* (2013.01); *G02B 5/286* (2013.01)

(58) Field of Classification Search

CPC ........... G02B 1/11; G02B 1/113; G02B 1/115; G02B 1/116; G02B 5/003; G02B 5/22; G02B 5/28; G02B 5/285; G02B 5/286; G04B 45/0015; G04B 45/0076; G04B 19/12

USPC .......................................................... 359/885

See application file for complete search history.

(56) References Cited

U.S. PATENT DOCUMENTS

| | | | | |
|---|---|---|---|---|
| 2016/0154143 A1* | 6/2016 | Furusato | ................ | G04B 39/00 359/581 |
| 2018/0217560 A1 | 8/2018 | Furusato | | |
| 2021/0030134 A1* | 2/2021 | Kim | ...................... | C03C 17/245 |

FOREIGN PATENT DOCUMENTS

| | | |
|---|---|---|
| JP | 2018124269 A | 8/2018 |

* cited by examiner

*Primary Examiner* — Angela M. Medich

(74) *Attorney, Agent, or Firm* — Harness, Dickey & Pierce, P.L.C.

(57) ABSTRACT

A watch component of the present disclosure includes a substrate, and a multilayer film covering at least a part of the substrate. A plurality of recesses is formed in a surface, of the substrate, facing the multilayer film. In a cross-sectional view obtained by cutting the substrate in a thickness direction, the plurality of recesses is defined by a first side, and a second side tilted with respect to the first side and being in contact with the first side at an end portion. In the cross-sectional view, a ratio of a length of the second side along the thickness direction of the substrate with respect to a length of the second side along a direction orthogonal to the thickness direction of the substrate is greater than ½. The multilayer film includes three or more layers of a color absorption film composed of a material including Cr. A value of a brightness L* in a L*a*b* color space is equal to or less than 10 in plan view as viewed from the thickness direction of the substrate.

7 Claims, 7 Drawing Sheets

WATCH COMPONENT, WATCH, AND METHOD FOR MANUFACTURING WATCH COMPONENT

The present application is based on, and claims priority from JP Application Serial Number 2022-154717, filed Sep. 28, 2022, the disclosure of which is hereby incorporated by reference herein in its entirety.

BACKGROUND

1. Technical Field

The present disclosure relates to a watch component, a watch, and a method for manufacturing the watch component.

2. Related Art

JP-A-2018-124269 discloses a watch component in which a color adjusting film for adjusting the color tone is stacked on a substrate, which is a metallic luster part. In the watch component disclosed in JP-A-2018-124269, the external color tone is adjusted with the metallic luster part and the color adjusting film so that the aesthetics can be made excellent even without using precious metal as the main material.

In JP-A-2018-124269, while aesthetics like a precious metal can be provided, it is difficult to significantly reduce the reflectance of light with the color film, and it is difficult to achieve black with a very low value of the brightness L* such as vantablack.

SUMMARY

A watch component of the present disclosure includes a substrate, and a multilayer film covering at least a part of the substrate, wherein a plurality of recesses is formed in a surface, of the substrate, facing the multilayer film, in a cross-sectional view obtained by cutting the substrate in a thickness direction, the plurality of recesses is defined by a first side, and a second side tilted with respect to the first side and being in contact with the first side at an end portion, in the cross-sectional view, a ratio of a length of the second side along the thickness direction of the substrate with respect to a length of the second side along a direction orthogonal to the thickness direction of the substrate is greater than ½, the multilayer film includes three or more layers of a color absorption film composed of a material including Cr, and a value of a brightness L* in a L*a*b* color space is equal to or less than 10 in plan view as viewed from the thickness direction of the substrate.

A watch component of the present disclosure includes a substrate, and a multilayer film covering at least a part of the substrate, wherein a plurality of recesses is formed in a surface, of the substrate, facing the multilayer film, in a cross-sectional view obtained by cutting the substrate in a thickness direction, the plurality of recesses is defined by a first side, and a second side tilted with respect to the first side and being in contact with the first side at an end portion, in the cross-sectional view, a ratio of a length of the second side along the thickness direction of the substrate with respect to a length of the second side along a direction orthogonal to the thickness direction of the substrate is greater than ½, a value of a brightness L* in a L*a*b* color space is equal to or less than 10 in plan view as viewed from the thickness direction of the substrate, and when the multilayer film is disposed on a planar surface, the multilayer film has a value of the brightness L* of equal to or less than 18 in plan view as viewed from the thickness direction of the multilayer film.

A watch of the present disclosure includes the watch component described above.

A method for manufacturing a watch component of the present disclosure is a method for manufacturing a watch component, the watch component including a substrate and a multilayer film covering at least a part of the substrate, the method including forming a plurality of recesses in a surface of the substrate, and stacking the multilayer film on at least a part of the surface, of the substrate, in which the plurality of recesses is formed, wherein in a cross-sectional view obtained by cutting the substrate in a thickness direction, the plurality of recesses is defined by a first side, and a second side tilted with respect to the first side and being in contact with the first side at an end portion, in the cross-sectional view, a ratio of a length of the second side along the thickness direction of the substrate with respect to a length of the second side along a direction orthogonal to the thickness direction of the substrate is greater than ½, the multilayer film includes three or more layers of a color absorption film composed of a material including Cr, and a value of a brightness L* in a L*a*b* color space is equal to or less than 10 in plan view as viewed from the thickness direction of the substrate.

A method for manufacturing a watch component of the present disclosure is a method for manufacturing a watch component, the watch component including a substrate and a multilayer film covering at least a part of the substrate, the method including forming a plurality of recesses in a surface of the substrate, and stacking the multilayer film on at least a part of the surface, of the substrate, in which the plurality of recesses is formed, wherein in a cross-sectional view obtained by cutting the substrate in a thickness direction, the plurality of recesses is defined by a first side, and a second side tilted with respect to the first side and being in contact with the first side at an end portion, in the cross-sectional view, a ratio of a length of the second side along the thickness direction of the substrate with respect to a length of the second side along a direction orthogonal to the thickness direction of the substrate is greater than ½, a value of a brightness L* in a L*a*b* color space is equal to or less than 10 in plan view as viewed from the thickness direction of the substrate, and when the multilayer film is disposed on a planar surface, the multilayer film has a value of the brightness L* of equal to or less than 18 in plan view as viewed from the thickness direction of the multilayer film.

A watch of the present disclosure includes a watch component manufactured by the above-described method for manufacturing a watch component.

DESCRIPTION OF EMBODIMENTS

First Embodiment

A watch 1 according to an embodiment of the present disclosure is described below with reference to the drawings.

Figure 1:
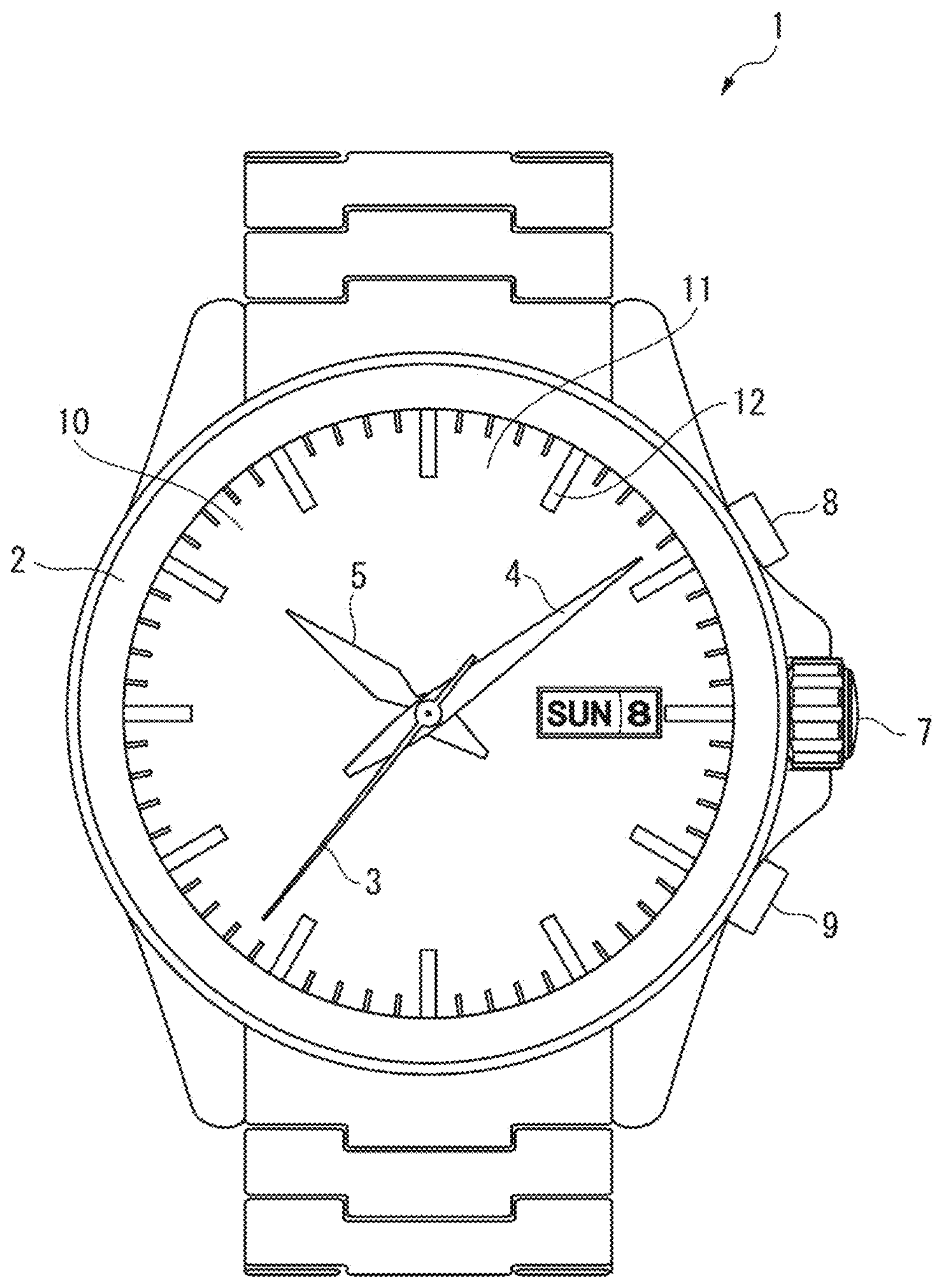
FIG. 1 is a front view illustrating a watch of a first embodiment.

FIG. 1 is a front view illustrating the watch 1. In the first embodiment, the watch 1 is configured as a wristwatch worn on a user's wrist.

Figure 2:
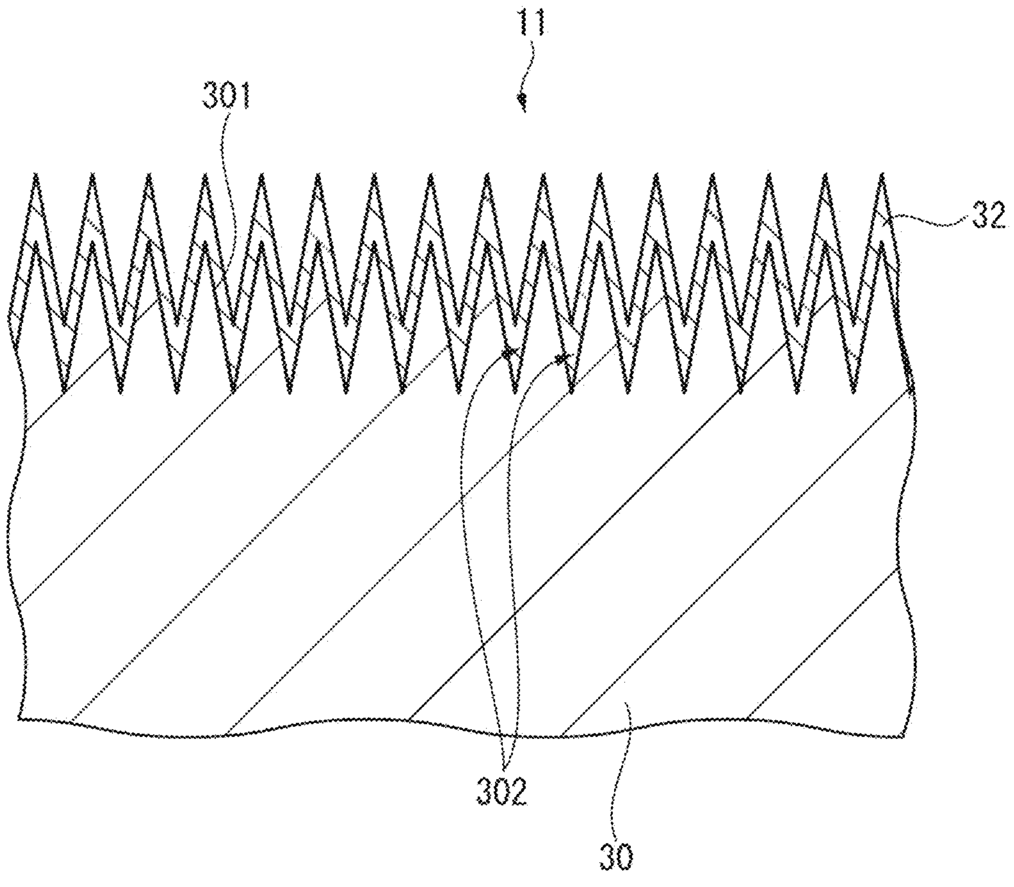
FIG. 2 is a cross-sectional view illustrating a main part of a dial body part of the first embodiment.

As illustrated in FIGS. 1 and 2, the watch 1 includes a metal case 2. The case 2 includes inside a disk-shaped dial 10, a seconds hand 3, a minute hand 4, an hour hand 5, a crown 7, an A button 8, and a B button 9. The dial 10 includes a dial body part 11, and an hour mark 12 provided on the dial body part 11. Note that the dial 10 is an example of the watch component of the present disclosure.

In addition, the dial body part 11 is visually recognized as black with a very low brightness, but the dial body part 11 is illustrated with a solid color (white) in FIG. 1.

Dial Body Part

Figure 3:
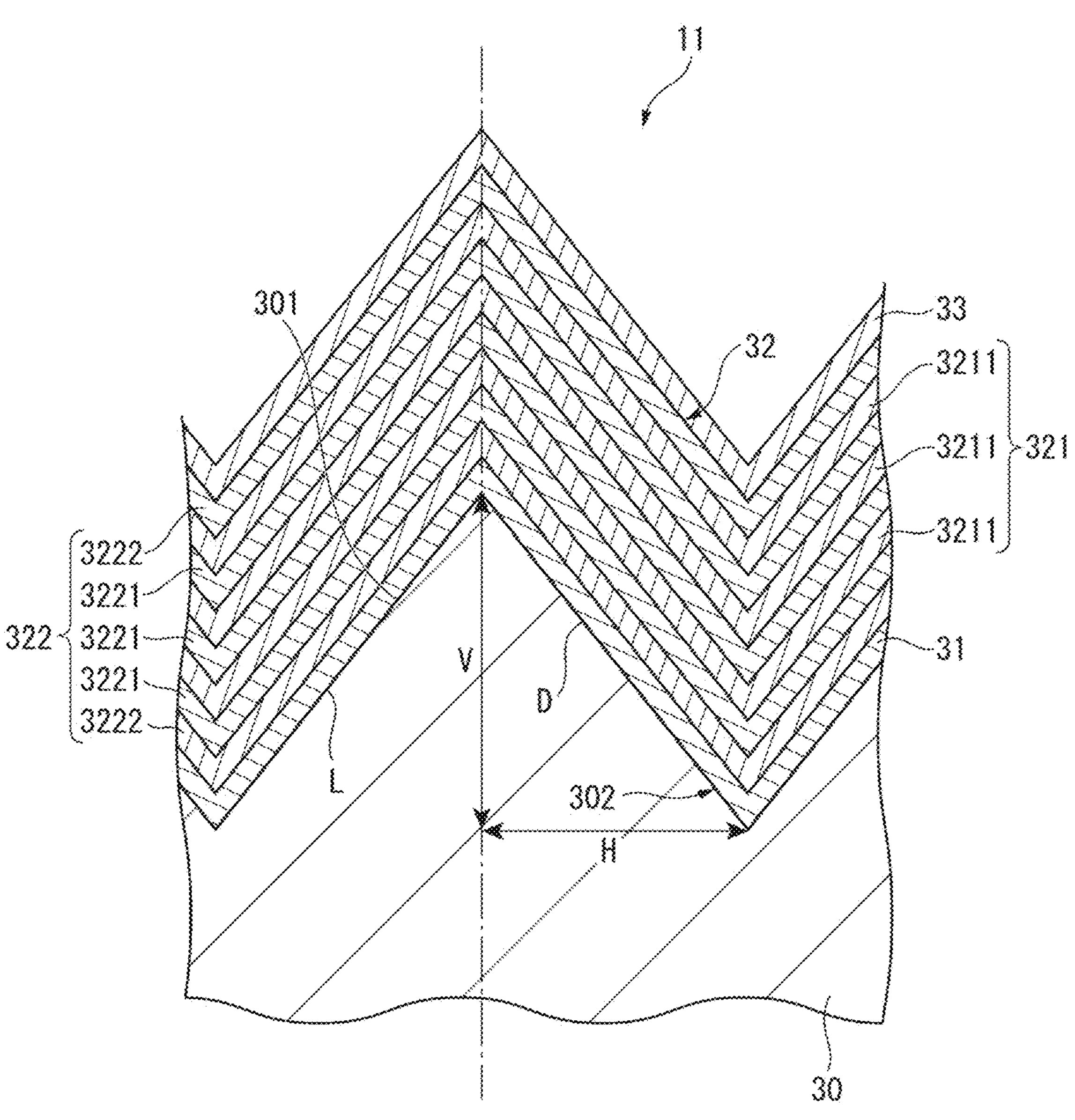
FIG. 3 is an enlarged cross-sectional view illustrating a main part of the dial body part of the first embodiment.
Figure 4:
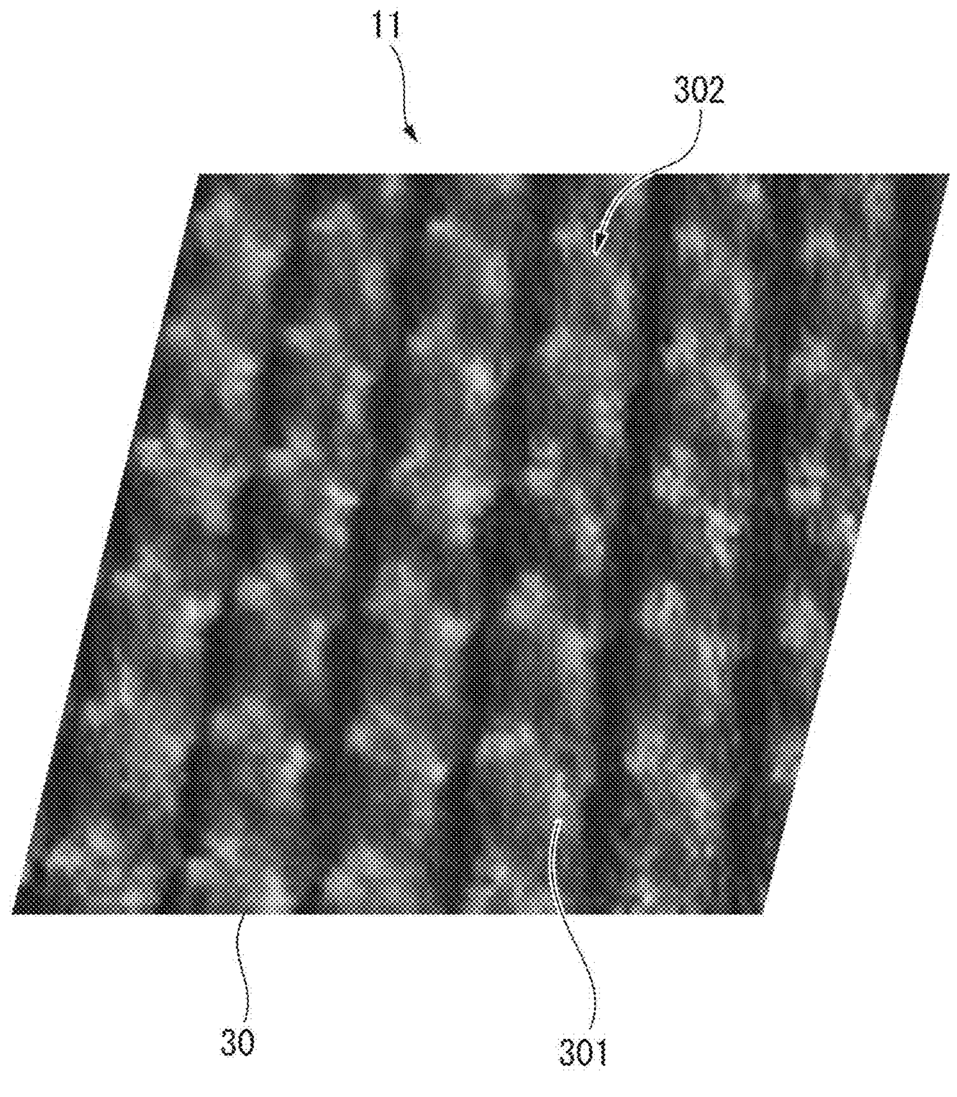
FIG. 4 is an enlarged perspective view illustrating a main part of the dial body part of the first embodiment.

FIG. 2 is a cross-sectional view illustrating a main part of the dial body part 11, FIG. 3 is an enlarged cross-sectional view illustrating a main part of the dial body part 11, and FIG. 4 is an enlarged perspective view illustrating a main part of the dial body part 11. Note that FIGS. 2 and 3 are cross-sectional views obtained by cutting the substrate 30 in the dial body part 11 in the thickness direction.

As illustrated in FIGS. 2 to 4, the dial body part 11 includes a substrate 30, a foundation layer 31, a multilayer film 32, and a protective layer 33. In this embodiment, the entirely of the substrate 30 is covered with the foundation layer 31, the multilayer film 32, and the protective layer 33. Specifically, the foundation layer 31, the multilayer film 32, and the protective layer 33 are stacked so as to cover the entirety of a surface 301 of the substrate 30.

Note that the dial body part 11 is not limited to the above-mentioned configuration, and the foundation layer 31, the multilayer film 32, and the protective layer 33 may be stacked so as to cover a part of the surface 301 of the substrate 30, for example.

Substrate

The material of the substrate 30 is composed of a metal such as iron, brass, and aluminum, resin or the like. Note that when the substrate 30 is composed of resin, the resin may be a non-light transmissive resin that does not transmit light, or a light transmissive resin that transmits light.

In this embodiment, a plurality of recesses 302 is formed in the surface 301 of the substrate 30 in the dial body part 11.

Recess

In a cross-sectional view obtained by cutting the substrate 30 in the thickness direction, the recess 302 is defined by a straight line side L, and an oblique side D tilted with respect to the straight line side L and being in contact with the straight line side L at an end portion. The straight line side L is tilted such that it is line-symmetric with the oblique side D with respect to a symmetry axis A1 extending in the thickness direction of the substrate 30. More specifically, in this embodiment, the recess 302 is formed such that a plurality of cone-shaped protrusions is formed at the surface 301 as illustrated in FIG. 4.

Note that the straight line side L is an example of the first side of the present disclosure, and the oblique side D is an example of the second side of the present disclosure. In addition, the depth of the recess 302 is not limited, but the depth of the recess 302 is about several tens of micrometers, for example.

In this embodiment, the recess 302 is formed such that the ratio of a length V of the oblique side D along the thickness direction of the substrate 30 with respect to a length H of the oblique side D along the direction orthogonal to the thickness direction of the substrate 30 is greater than ½. Specifically, the recess 302 is formed such that the ratio of V and H is greater than 1:2.

In other words, the recess 302 is formed such that when the length V of the oblique side D with respect to the thickness direction of the substrate 30 is set as 1, the length H of the oblique side D with respect to the direction orthogonal to the thickness direction of the substrate 30 is less than 2, i.e., H is less than two times V.

Foundation Layer

The foundation layer 31 is stacked on the surface 301 of the substrate 30. In this embodiment, the foundation layer 31 is composed of plating such as Ni, for example. In this embodiment, by stacking the foundation layer 31 on the surface 301 of the substrate 30, the multilayer film 32 can be easily stacked.

Multilayer Film

The multilayer film 32 includes a color absorption film 321 and a color adjustment film 322, and is stacked on the foundation layer 31.

The color absorption film 321 is formed with a metal. Note that the metal making up the color absorption film 321 may be Ag, Pt, Au, Cu, Al, Cr, Sn, Fe, Ti or the like, or their alloys.

The method for forming the color absorption film 321 is not limited, but examples of the method include ion-assisted deposition, ion plating vapor deposition, vacuum deposition, and a sputtering method. In this manner, the layer composition of the multilayer film 32 can be arbitrarily changed.

In this embodiment, the color absorption film 321 includes three layers of a chromium color absorption film 3211 composed of a material including Cr. In this manner, the reflectance of light incident on the multilayer film 32 can be reduced.

The color adjustment film 322 is a film that adjusts the color tone through optical interference. In this embodiment, the color adjustment film 322 is composed of a multilayer film including an inorganic film. More specifically, the color adjustment film 322 may be composed of a material including at least one of $Ta_2O_5$, $SiO_2$, $TiO_2$, $Al_2O_3$, $ZrO_2$, $Nb_2O_5$, $HfO_2$, $NasAl_3F_{14}$, $Na_3AlF_6$, $AlF_3$, $MgF_2$, $CaF_2$, $BaF_2$, $YF_3$, $LaF_3$, $CeF_3$, or $NdF_3$. In this manner, since these inorganic substances have high chemical stability, high stability and durability of the external appearance as a watch component can be achieved. Further, the range of the variation of the black with low values of the brightness L* can be increased.

In this embodiment, the color adjustment film 322 includes an aluminum oxide color adjustment film 3221 composed of a material including $Al_2O_3$, and a silicon dioxide color adjustment film 3222 composed of a material including $SiO_2$. The chromium color absorption film 3211 is stacked on the aluminum oxide color adjustment film 3221. Specifically, in this embodiment, the multilayer film 32 includes a plurality of portions where the chromium color absorption film 3211 composed of a material including Cr and the aluminum oxide color adjustment film 3221 composed of a material including $Al_2O_3$ are stacked. In this manner, the reflectance of light incident on the multilayer film 32 can be reduced, and thus black with a much lower value of the brightness L* can be achieved.

Note that the multilayer film 32 is not limited to the above-mentioned configuration, and the order of the color absorption film 321 and the color adjustment film 322 can be arbitrarily set.

Note that the method for forming the color adjustment film 322 is not limited, but examples of the method include ion-assisted deposition, ion plating vapor deposition, vacuum deposition, and a sputtering method. In this manner, the layer composition of the multilayer film 32 can be arbitrarily changed.

Protective Layer

The protective layer 33 is a transparent layer stacked on the surface of the multilayer film 32. In this embodiment, the protective layer 33 is formed with a transparent resin such as an acrylic resin.

Method for Manufacturing Dial

Next, a method for manufacturing the dial 10 is described.

First, the plurality of recesses 302 is formed in the surface 301 of the substrate 30 in the dial body part 11 of the dial 10. For example, the recess 302 is formed through processing such as cutting processing, laser processing, chemical removal processing, polishing processing, and forging or casting processing on the surface 301 of the substrate 30. In this case, a plurality of cone-shaped protrusions is formed at the surface 301 by forming the recess 302 such that the ratio of the length V of the oblique side D along the thickness direction of the substrate 30 with respect to the length H of the oblique side D along the direction orthogonal to the thickness direction of the substrate 30 is greater than ½.

Next, the foundation layer 31, the multilayer film 32, and the protective layer 33 are stacked on the surface 301 of the substrate 30 in the dial body part 11. More specifically, the color absorption film 321 is formed at the surface 301 of the substrate 30 through ion-assisted deposition, ion plating vapor deposition, vacuum deposition, a sputtering method, or the like. Thereafter, the foundation layer 31, the color absorption film 321, the color adjustment film 322, and the protective layer 33 are stacked through ion-assisted deposition, ion plating vapor deposition, vacuum deposition, a sputtering method and the like. In this manner, the dial 10 can be manufactured.

Further, the watch 1 can be manufactured by using the dial 10 manufactured by the above-described manufacturing method for the watch 1.

In this embodiment, the inclination of the oblique side D in the recess 302 can be arbitrarily changed by forming the recess 302 through processing such as cutting processing, laser processing, chemical removal processing, polishing processing, and forging or casting processing.

Figure 5:
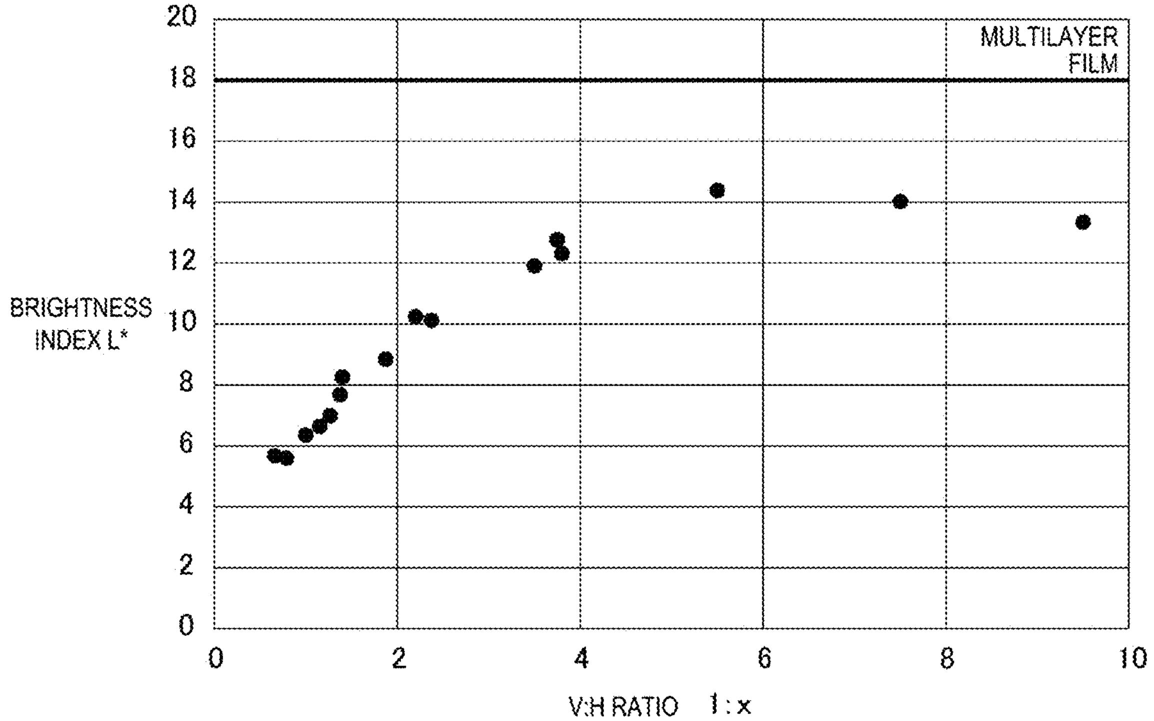
FIG. 5 is a diagram showing a relationship between a brightness L* and a ratio of a length V of the oblique side in the thickness direction of a substrate and a length H of the oblique side in the direction orthogonal to the thickness direction of the substrate.

FIG. 5 is a diagram showing a relationship between the brightness L* and the ratio of the length V of the oblique side D in the thickness direction of the substrate 30 and the length H of the oblique side D in the direction orthogonal to the thickness direction of the substrate 30. In FIG. 5, the recess 302 was formed in the substrate 30 made of brass such that the ratio of the length V of the oblique side in the thickness direction of the substrate 30 and the length H of the oblique side in the direction orthogonal to the thickness direction of the substrate 30 is 1:1 to 1:10, and the foundation layer 31, the multilayer film 32, and the protective layer 33 were stacked on the surface 301 of the substrate 30 to measure the brightness L*. The measurement of the brightness L* was performed by using a spectroscopic colorimeter on a measurement condition with specular reflection light measurement, a light source D65, and a viewing angle of 10 degrees.

Here, in FIG. 5, the multilayer film 32 has a configuration the same as or similar to those of the color absorption film 321 and the color adjustment film 322 illustrated in FIG. 3, and is formed such that the value of the brightness L* is 18 in plan view as viewed from the thickness direction of the multilayer film 32 when the multilayer film 32 is disposed on a planar surface. In addition, the substrate 30 in which the recess 302 is formed is formed such that the value of the brightness L* is 32 in plan view as viewed from the thickness direction of the substrate 30 in the state where the multilayer film 32 is not stacked.

Note that in the present disclosure, the brightness L* is a brightness value in a L*a*b* color space defined by CIE (Commission Internationale d'Eclairage; International Commission on Illumination). When the value of L* is "0", it is the brightness of an object that reflects no light (completely absorbs the light). When the value of L* is "100", it is a value of the brightness of white that totally reflects light.

As shown in FIG. 5, it was suggested that the greater the length ratio of the length V of the oblique side in the thickness direction of the substrate 30 with respect to the length H of the oblique side D in the direction orthogonal to the thickness direction of the substrate 30, the less the value of the brightness L*. In particular, it was suggested that when the length ratio of the length V of the oblique side in the thickness direction of the substrate 30 with respect to the length H of the oblique side D in the direction orthogonal to the thickness direction of the substrate 30 is greater than 1:2 (in FIG. 5, the region on the left side of 2 of the abscissa indicating the V:H ratio), i.e., the ratio of the length V of the oblique side D along the thickness direction of the substrate 30 with respect to the length H of the oblique side D along the direction orthogonal to the thickness direction of the substrate 30 is greater than ½, the value of the brightness L* can be set to a value equal to or less than 10. The reason for this is surmised that when the length ratio of the length V of the oblique side in the thickness direction of the substrate 30 with respect to the length H of the oblique side with respect to the direction orthogonal to the thickness direction of the substrate 30 is increased, the inclination of the oblique side D with respect to the straight line side L is increased, and thus the reflectance of light incident on the recess 302 can be reduced.

Further, it is surmised that since the multilayer film 32 includes three layers of the chromium color absorption film 3211 composed of a material including Cr, and also a plurality of portions where the chromium color absorption film 3211 and the aluminum oxide color adjustment film 3221 are stacked, the reflectance of light incident on the multilayer film 32 can be reduced, and the value of the brightness L* of the multilayer film 32 itself can be set to a value as low as 18.

In this manner, in this embodiment, in plan view as viewed from the thickness direction of the substrate 30, the value of the brightness L* can be set to a value equal to or less than 10, and black with a very low value of the brightness L* such as vantablack can be achieved.

Operational Effects of Embodiment

According to the above-described embodiment, the following effects can be achieved.

In this embodiment, the plurality of recesses 302 is formed in the surface 301, of the substrate 30, facing the multilayer film 32. In a cross-sectional view obtained by cutting the substrate 30 in the thickness direction, the plurality of recesses 302 is defined by the straight line side L, and the oblique side D tilted with respect to the straight line side L and being in contact with the straight line side L at an end portion, and the ratio of the length V of the oblique side D along the thickness direction of the substrate 30 with respect to the length H of the oblique side D along the direction orthogonal to the thickness direction of the substrate 30 is greater than ½. In this manner, the reflectance of light incident on the recess 302 can be reduced. Further, since the multilayer film 32 includes three layers of the chromium color absorption film 3211 composed of a material including Cr, the reflectance of light incident on the multilayer film 32 can be reduced. In this manner, in plan view as viewed from the thickness direction of the substrate 30, the value of the brightness L* can be set to a value equal to or less than 10, and thus black with a very low value of the brightness L* such as vantablack can be achieved.

In this embodiment, the multilayer film 32 has a low value of the brightness L* of equal to or less than 18 in plan view as viewed from the thickness direction of the multilayer film 32 when the multilayer film 32 is disposed on a planar surface, and thus black with a much lower value of the brightness L* can be achieved.

The multilayer film 32 includes the color adjustment film 322 composed of a material including at least one of $Ta_2O_5$, $SiO_2$, $TiO_2$, $Al_2O_3$, $ZrO_2$, $Nb_2O_5$, $HfO_2$, $Na_5Al_3F_{14}$, $Na_3AlF_6$, $AlF_3$, $MgF_2$, $CaF_2$, $BaF_2$, $YF_3$, $LaF_3$, $CeF_3$, or $NdF_3$, and thus the stability and durability of the external appearance of as the dial 10 can be increased. Further, the range of the variation of the black with low values of the brightness L* can be increased.

In this embodiment, the multilayer film 32 includes a plurality of portions where the chromium color absorption film 3211 and the aluminum oxide color adjustment film 3221 are stacked, and thus the multilayer film 32 can reduce the reflectance of light incident on the multilayer film 32, and, black with a much lower value of the brightness L* can be achieved.

In this embodiment, the recess 302 is formed through any one of cutting processing, laser processing, chemical removal processing, polishing processing, or forging or casting processing. In this manner, the inclination of the oblique side D in the recess 302 can be arbitrarily changed.

In this embodiment, the multilayer film 32 is formed through any one of ion-assisted deposition, ion plating vapor deposition, vacuum deposition, or a sputtering method. In this manner, the layer composition of the multilayer film 32 can be arbitrarily changed.

Second Embodiment

Next, a second embodiment of the present disclosure is described with reference to FIGS. 6 and 7. The second embodiment is different from the above-described first embodiment in that a recess 302A of a dial body part 11A is defined by a first side L1 and a second side D1 with curved shapes.

Note that in the second embodiment, components the same as or similar to those of the first embodiment are denoted with the same reference numerals, and the description will be omitted or simplified.

Dial Body Part

Figure 6:
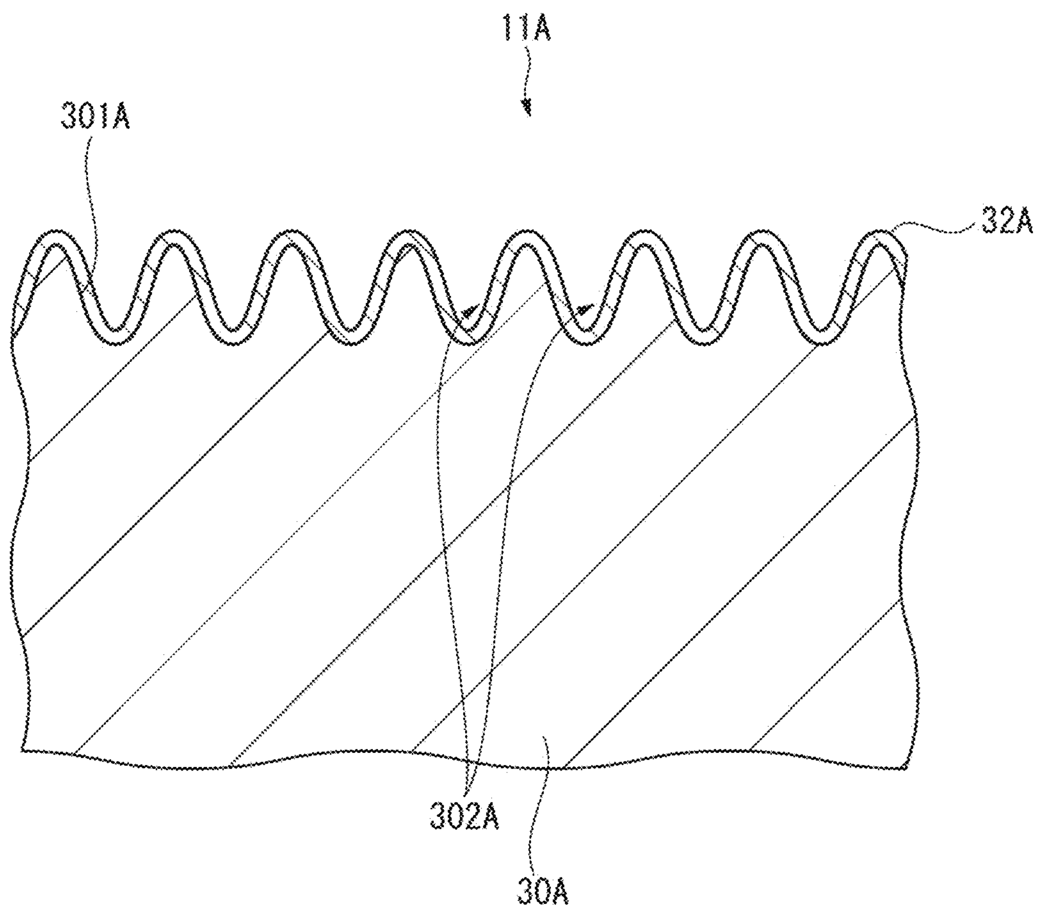
FIG. 6 is a cross-sectional view illustrating a dial body main part of a second embodiment.
Figure 7:
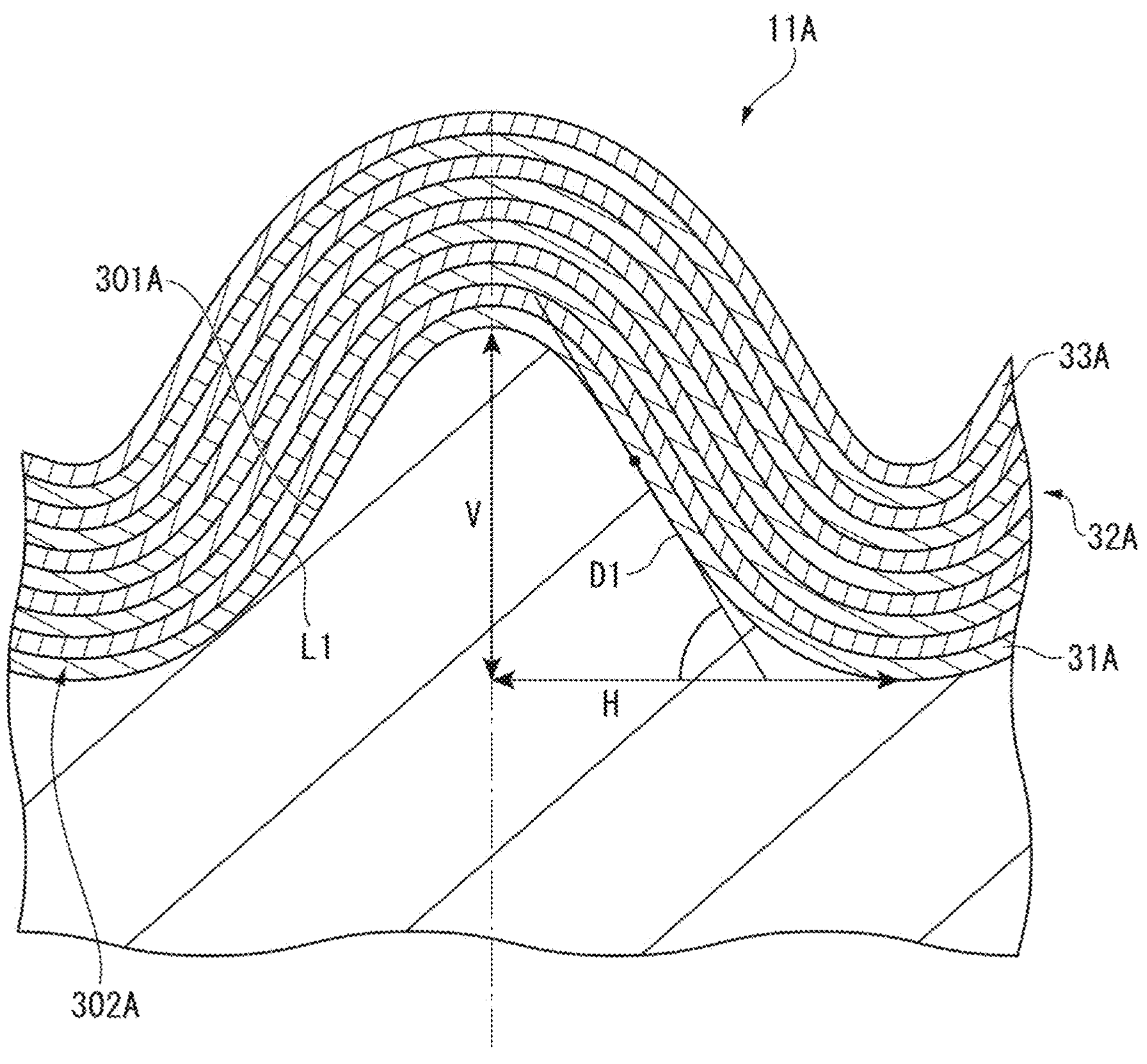
FIG. 7 is an enlarged cross-sectional view illustrating the dial body main part of the second embodiment.

FIG. 6 is a cross-sectional view illustrating a main part of the dial body part 11A, and FIG. 7 is an enlarged cross-sectional view illustrating a main part of the dial body part 11A. Note that FIGS. 6 and 7 are cross-sectional views obtained by cutting the substrate 30A in the dial body part 11A in the thickness direction.

As illustrated in FIGS. 6 and 7, the dial body part 11A includes the substrate 30A, the foundation layer 31A, the multilayer film 32A, and the protective layer 33A as in the above-described dial body part 11 of the first embodiment.

Recess

In a cross-sectional view obtained by cutting the substrate 30A in the thickness direction, the recess 302A is defined by the first side L1, and the second side D1 tilted with respect to the first side L1 and being in contact with the first side L1 at an end portion. In this embodiment, the first side L1 and the second side D1 are curved.

In addition, as in the above-described first embodiment, the recess 302A is formed such that a plurality of cone-shaped protrusions is formed at the surface 301A.

As in the above-described first embodiment, the recess 302A is formed such that the ratio of the length V of the second side D1 along the thickness direction of the substrate 30A with respect to the length H of the second side D1 along the direction orthogonal to the thickness direction of the substrate 30A is greater than ½. That is, the recess 302A is formed such that the ratio of V and H is greater than 1:2.

Operational Effects of Second Embodiment

According to the above-described embodiment, the following effects can be achieved.

In this embodiment, the first side L1 and the second side D1 defining the recess 302A are curved. In this manner, since the side defining the recess 302A is not limited to straight lines, greater flexibility in the processing for forming the recess 302A can be achieved.

Modifications

Note that the present disclosure is not limited to the above-described embodiments, and may be modified and changed in so far as the advantages of the present disclosure can be achieved.

In the above-described each embodiment, the multilayer films 32 and 32A include three layers of the chromium color absorption film 3211 composed of a material including Cr, but this is not limitative. For example, the multilayer film may be two or less layers of the chromium absorption film composed of a material including Cr. Also in this case, the reflectance of light incident on the multilayer film can be reduced by setting the value of the brightness L* of the multilayer film to a value equal to or less than 18, and thus the value of the brightness L* in the L*a*b* color space can be set to a value equal to or less than 10 in plan view as viewed from the thickness direction of the substrate. As a result, black with a very low value of the brightness L* such as vantablack can be achieved.

In addition, the multilayer films 32 and 32A may include three or more layers of the chromium absorption film composed of a material including Cr.

In the above-described each embodiment, the recesses 302 and 302A are formed through any one of cutting processing, laser processing, chemical removal processing, polishing processing, or forging or casting processing, but this is not limitative. For example, the recess may be formed through femtolaser processing or picolaser processing. In this manner, the inclination of the second side in the recess can be changed with higher accuracy.

In the above-described each embodiment, the recesses 302 and 302A are formed in the substrates 30 and 30A of the dial body parts 11 and 11A, and the multilayer films 32 and 32A are stacked on the surfaces 301 and 301A of the substrates 30 and 30A, but this is not limitative. For example, the recess may be formed in the substrate of the hour mark of the dial and the multilayer film may be stacked. Further, the dial body part and the hour mark may differ in the inclination of the oblique side with respect to the straight line side. In this manner, black with slightly different color appearances can be visually recognized with the dial body part and the hour mark, and thus the design property can be increased.

In the above-described embodiments, the watch component of the present disclosure is configured as the dial 10, but this is not limitative. For example, the watch component of the present disclosure may be configured as one of a case, a dial ring, a glass edge, a movement, a handle, or an oscillating weight.

Overview of Present Disclosure

A watch component of the present disclosure includes a substrate, and a multilayer film covering at least a part of the substrate, wherein a plurality of recesses is formed in a surface, of the substrate, facing the multilayer film, in a cross-sectional view obtained by cutting the substrate in a thickness direction, the plurality of recesses is defined by a first side, and a second side tilted with respect to the first side and being in contact with the first side at an end portion, in the cross-sectional view, a ratio of a length of the second side along the thickness direction of the substrate with respect to a length of the second side along a direction orthogonal to the thickness direction of the substrate is greater than ½, the multilayer film includes three or more layers of a color absorption film composed of a material including Cr, and a value of a brightness L* in a L*a*b* color space is equal to or less than 10 in plan view as viewed from the thickness direction of the substrate.

In the present disclosure, the plurality of recesses is formed in the surface, of the substrate, facing the multilayer film. In the cross-sectional view obtained by cutting the substrate in the thickness direction, the plurality of recesses is defined by the first side, and the second side tilted with respect to the first side and being in contact with the first side at an end portion, and the ratio of the length of the second side along the thickness direction of the substrate with respect to the length of the second side along the direction orthogonal to the thickness direction of the substrate is greater than ½. In this manner, the reflectance of light incident on the recess can be reduced. Further, in the present disclosure, the multilayer film includes three or more layers of a color absorption film composed of a material including Cr, and thus the reflectance of light incident on the multilayer film can be reduced. In this manner, the value of the brightness L* in the L*a*b* color space can be set to a value equal to or less than 10 in plan view as viewed from the thickness direction of the substrate, and thus black with a very low value of the brightness L* such as vantablack can be achieved.

In the watch component of the present disclosure, when the multilayer film is disposed on a planar surface, the multilayer film may have a value of the brightness L* of equal to or less than 18 in plan view as viewed from the thickness direction of the multilayer film.

In this manner, the brightness of the multilayer film itself is reduced, and thus black with a much lower value of the brightness L* can be achieved.

In the watch component of the present disclosure, the multilayer film may include a color adjustment film composed of a material including at least one of $Ta_2O_5$, $SiO_2$, $TiO_2$, $Al_2O_3$, $ZrO_2$, $Nb_2O_5$, $HfO_2$, $NasAl_3F_{14}$, $Na_3AlF_6$, $AlF_3$, $MgF_2$, $CaF_2$, $BaF_2$, $YF_3$, $LaF_3$, $CeF_3$, or $NdF_3$.

In this manner, since these inorganic substances have high chemical stability, high stability and durability of the external appearance as a watch component can be achieved. Further, the range of the variation of the black with low values of the brightness L* can be increased.

In the watch component of the present disclosure, the color absorption film may include a film composed of a material including at least one of Ag, Pt, Au, Cu, Al, Cr, Sn, Fe, or Ti, in addition to a film composed a material including Cr.

In this manner, a luxurious appearance as a watch component can be achieved.

In the watch component of the present disclosure, the multilayer film may include a plurality of portions where the color absorption film composed of a material including Cr and the color adjustment film composed of a material including $Al_2O_3$ are stacked.

In this manner, the reflectance of light incident on the multilayer film can be reduced, and thus black with a much lower value of the brightness L* can be achieved.

A watch component of the present disclosure includes a substrate, and a multilayer film covering at least a part of the substrate, wherein a plurality of recesses is formed in a surface, of the substrate, facing the multilayer film, in a cross-sectional view obtained by cutting the substrate in a thickness direction, the plurality of recesses is defined by a first side, and a second side tilted with respect to the first side and being in contact with the first side at an end portion, in the cross-sectional view, a ratio of a length of the second side along the thickness direction of the substrate with respect to a length of the second side along a direction orthogonal to the thickness direction of the substrate is greater than ½, a value of a brightness L* in a L*a*b* color space is equal to or less than 10 in plan view as viewed from the thickness direction of the substrate, and when the multilayer film is disposed on a planar surface, the multilayer film has a value of the brightness L* of equal to or less than 18 in plan view as viewed from the thickness direction of the multilayer film.

In the present disclosure, the plurality of recesses is formed in the surface, of the substrate, facing the multilayer film. In the cross-sectional view obtained by cutting the substrate in the thickness direction, the plurality of recesses is defined by the first side, and the second side tilted with respect to the first side and being in contact with the first side at an end portion, and the ratio of the length of the second side along the thickness direction of the substrate with respect to the length of the second side along the direction orthogonal to the thickness direction of the substrate is greater than ½. In this manner, the reflectance of light incident on the recess can be reduced. Further, in the present disclosure, the multilayer film has a value of the brightness L* of equal to or less than 18 in plan view as viewed from the thickness direction of the multilayer film when the multilayer film is disposed on a planar surface, and thus the reflectance of light incident on the multilayer film can be reduced. In this manner, the value of the brightness L* in the L*a*b* color space can be set to a value equal to or less than 10 in plan view as viewed from the thickness direction of the substrate, and thus black with a very low value of the brightness L* such as vantablack can be achieved.

A watch of the present disclosure includes the watch component described above.

A method for manufacturing a watch component of the present disclosure is a method for manufacturing a watch component, the watch component including a substrate and a multilayer film covering at least a part of the substrate, the method including forming a plurality of recesses in a surface of the substrate, and stacking the multilayer film on at least a part of the surface, of the substrate, in which the plurality of recesses is formed, wherein in a cross-sectional view obtained by cutting the substrate in a thickness direction, the plurality of recesses is defined by a first side, and a second side tilted with respect to the first side and being in contact with the first side at an end portion, in the cross-sectional view, a ratio of a length of the second side along the thickness direction of the substrate with respect to a length of the second side along a direction orthogonal to the thickness direction of the substrate is greater than ½, the multilayer film includes three or more layers of a color absorption film composed of a material including Cr, and a value of a brightness L* in a L*a*b* color space is equal to or less than 10 in plan view as viewed from the thickness direction of the substrate.

In the present disclosure, the plurality of recesses is formed in the surface, of the substrate, facing the multilayer film. In the cross-sectional view obtained by cutting the substrate in the thickness direction, the plurality of recesses is defined by the first side, and the second side tilted with respect to the first side and being in contact with the first side at an end portion, and the ratio of the length of the second side along the thickness direction of the substrate with respect to the length of the second side along the direction orthogonal to the thickness direction of the substrate is greater than ½. In this manner, the reflectance of light incident on the recess can be reduced. Further, in the present disclosure, the multilayer film includes three or more layers of a color absorption film composed of a material including Cr, and thus the reflectance of light incident on the multilayer film can be reduced. In this manner, the value of the brightness L* in the L*a*b* color space can be set to a value equal to or less than 10 in plan view as viewed from the thickness direction of the substrate, and thus black with a very low value of the brightness L* such as vantablack can be achieved.

A method for manufacturing a watch component of the present disclosure is a method for manufacturing a watch component, the watch component including a substrate and a multilayer film covering at least a part of the substrate, the method including forming a plurality of recesses in a surface of the substrate, and stacking the multilayer film on at least a part of the surface, of the substrate, in which the plurality of recesses is formed, wherein in a cross-sectional view obtained by cutting the substrate in a thickness direction, the plurality of recesses is defined by a first side, and a second side tilted with respect to the first side and being in contact with the first side at an end portion, in the cross-sectional view, a ratio of a length of the second side along the thickness direction of the substrate with respect to a length of the second side along a direction orthogonal to the thickness direction of the substrate is greater than ½, a value of a brightness L* in a L*a*b* color space is equal to or less than 10 in plan view as viewed from the thickness direction of the substrate, and when the multilayer film is disposed on a planar surface, the multilayer film has a value of the brightness L* of equal to or less than 18 in plan view as viewed from the thickness direction of the multilayer film.

In the present disclosure, the plurality of recesses is formed in the surface, of the substrate, facing the multilayer film. In the cross-sectional view obtained by cutting the substrate in the thickness direction, the plurality of recesses is defined by the first side, and the second side tilted with respect to the first side and being in contact with the first side at an end portion, and the ratio of the length of the second side along the thickness direction of the substrate with respect to the length of the second side along the direction orthogonal to the thickness direction of the substrate is greater than ½. In this manner, the reflectance of light incident on the recess can be reduced. Further, in the present disclosure, the multilayer film has a value of the brightness L* of equal to or less than 18 in plan view as viewed from the thickness direction of the multilayer film when the multilayer film is disposed on a planar surface, and thus the reflectance of light incident on the multilayer film can be reduced. In this manner, the value of the brightness L* in the L*a*b* color space can be set to a value equal to or less than 10 in plan view as viewed from the thickness direction of the substrate, and thus black with a very low value of the brightness L* such as vantablack can be achieved.

In the method for manufacturing the watch component, the recess may be formed through any one of cutting processing, laser processing, patterning processing, chemical removal processing, polishing processing, or forging or casting processing.

In this manner, the inclination of the second side in the recess can be arbitrarily changed.

In the method for manufacturing the watch component, the recess may be formed through femtolaser processing or picolaser processing.

In this manner, the inclination of the second side in the recess can be changed with higher accuracy.

In the method for manufacturing the watch component of the present disclosure, the multilayer film may be formed through any one of ion-assisted deposition, ion plating vapor deposition, vacuum deposition, or a sputtering method.

In this manner, the layer composition of the multilayer film can be arbitrarily changed.

A watch of the present disclosure is a watch including a watch component manufactured by the above-described method for manufacturing a watch component.

What is claimed is:

1. A watch component comprising:

a substrate; and a multilayer structure covering at least a part of the substrate, the multilayer structure being configured with a plurality of color absorption films interleaved with a plurality of color adjustment films, wherein a plurality of recesses is formed in a surface of the substrate, and the plurality of recesses face the multilayer structure, in a cross-sectional view obtained by cutting the substrate in a thickness direction, each of the plurality of recesses is defined by a first side and a second side that is tilted with respect to the first side and that is in contact with the first side at an end portion, in the cross-sectional view, a ratio of a length of the second side along the thickness direction of the substrate with respect to a length of the second side along a direction orthogonal to the thickness direction of the substrate is greater than ½, a value of a brightness L* in a L*a*b* color space of the watch component is equal to or less than 10 in a plan view as viewed from the thickness direction of the substrate, at least three color absorption films of the plurality of color absorption films and at least three color adjustment films of the plurality of color adjustment films are alternately directly stacked on one another, each of the at least three color absorption films contains a material including Cr, and each of the plurality of color adjustment films contains a material including at least one of $Ta_2O_5$, $SiO_2$, $TiO_2$, $Al_2O_3$, $ZrO_2$, $Nb_2O_5$, $HfO_2$, $Na_5Al_3F_{14}$, $Na_3AlF_6$, $AlF_3$, $MgF_2$, $CaF_2$, $BaF_2$, $YF_3$, $LaF_3$, $CeF_3$, and $NdF_3$.

2. The watch component according to claim 1, wherein, when the multilayer structure is disposed on a planar surface, the multilayer structure has a value of the brightness L* of equal to or less than 18 in the plan view as viewed from the thickness direction.

3. The watch component according to claim 1, wherein the plurality of color absorption films include a film composed of a material including at least one of Ag, Pt, Au, Cu, Al, Cr, Sn, Fe, and Ti, in addition to the at least three color absorption films composed of the material including Cr.

4. The watch component according to claim 3, wherein the multilayer structure includes a plurality of portions where the at least three color absorption films composed of the material including Cr and some color adjustment films of the plurality of color adjustment films respectively composed of the material including $Al_2O_3$ are alternately directly stacked on one another.

5. A watch comprising the watch component according to claim 1.

6. A watch component comprising:

a substrate; and a multilayer structure covering at least a part of the substrate, the multilayer structure being configured with a plurality of color absorption films interleaved with a plurality of color adjustment films, wherein a plurality of recesses is formed in a surface of the substrate, the plurality of recesses face the multilayer structure, in a cross-sectional view obtained by cutting the substrate in a thickness direction, each of the plurality of recesses is defined by a first side and a second side that is tilted with respect to the first side and that is in contact with the first side at an end portion, in the cross-sectional view, a ratio of a length of the second side along the thickness direction of the substrate with respect to a length of the second side along a direction orthogonal to the thickness direction of the substrate is greater than ½, a value of a brightness L* in a L*a*b* color space of the watch component is equal to or less than 10 in a plan view as viewed from the thickness direction of the substrate, when the multilayer structure is disposed on a planar surface, the multilayer structure has a value of the brightness L* of equal to or less than 18 in the plan view as viewed from the thickness direction, the plurality of color absorption films and the plurality of color adjustment films are alternately directly stacked on one another, one of the plurality of color absorption films contains a material including Cr, and each of the plurality of color adjustment films contains a material including at least one of $Ta_2O_5$, $SiO_2$, $TiO_2$, $Al_2O_3$, $ZrO_2$, $Nb_2O_5$, $HfO_2$, $Na_5Al_3F_{14}$, $Na_3AlF_6$, $AlF_3$, $MgF_2$, $CaF_2$, $BaF_2$, $YF_3$, $LaF_3$, $CeF_3$, and $NdF_3$.

7. A watch comprising the watch component according to claim 6.

* * * * *